Nov. 26, 1963  R. D. ERNEST ETAL  3,112,067
ELECTRIC DIFFERENTIAL COUNTER
Filed March 13, 1959  4 Sheets-Sheet 1

RALPH D. ERNEST
WILBERT FRED NIBBELINK
FREDERICK A. KOMATAR

INVENTORS

BY Bruno C. Lechler
Attorney

Nov. 26, 1963

R. D. ERNEST ETAL 3,112,067

ELECTRIC DIFFERENTIAL COUNTER

Filed March 13, 1959

RALPH D. ERNEST
WILBERT FRED NIBBELINK
FREDERICK A. KOMATAR
INVENTORS

Bruno C. Lechler
ATTORNEY

Nov. 26, 1963    R. D. ERNEST ETAL    3,112,067
ELECTRIC DIFFERENTIAL COUNTER
Filed March 13, 1959    4 Sheets-Sheet 3

RALPH D. ERNEST
WILBERT FRED NIBBELINK
FREDERICK A. KOMATAR
INVENTORS

BY Bruno C. Lechler
Attorney

RALPH D. ERNEST
WILBERT FRED NIBBELINK
FREDERICK A. KOMATAR

INVENTORS

BY Bruno C Lechler

ATTORNEY

US 3,112,067

Patented Nov. 26, 1963

3,112,067
ELECTRIC DIFFERENTIAL COUNTER
Ralph D. Ernest and Wilbert Fred Nibbelink, Dearborn, Mich., and Frederick A. Komatar, East Moline, Ill., assignors, by mesne assignments, to The Gamewell Company, Newton, Mass., a corporation of Delaware
Filed Mar. 13, 1959, Ser. No. 799,363
12 Claims. (Cl. 235—132)

This invention relates to electric counting and indicating devices capable of receiving and registering count impulses from two sources simultaneously, adding the impulses received from one source to form a total and subtracting those received from the other source from the total to arrive at a net count. The device has one electric switch closed after the first count and a second switch closed at a predetermined count. The mechanism also permits the manual adjustment of the predetermined count and the manual resetting of the count indicator at any time before, during, or after the preset count is reached.

The primary object of the invention is to provide a differential counter which closes a circuit when the net count is zero and closes another circuit when the net count reaches an adjustable preset count.

A further object is to provide a device that will count passing items and subtract rejected items to supply a net count of accepted items and close a circuit after a preset number of acceptable items.

Another object is to provide a device which will give a signal indication each time a predetermined number of acceptable items passes a given point.

Another object is to provide two such devices connected in series to count a large number of acceptable items, the total capacity of the two units being the product of the capacities of each of the units.

Another object is to provide an incentive counter which determines the number of items of acceptable quality in excess of a minimum quantity which pass the counter in a unit time.

Another object is to operate an add subtract counter functioning only after an operation taking some time to complete is finished thus recording only completed operations.

The invention provides a differential counter having electric switches operated at zero count and at a preset count, and which counts with highest accuracy. The count is not registered until the actuating current ceases thus insuring that the process on an article is completed before its count is added.

The counter features separate cams which open or close electric switches at zero count and at a predetermined count. The cams are mounted near the back of the counter on concentric shafts which project also from the front of the timer. One cam is readily adjustable by turning the single adjustment knob; the other cam is adjustable by first pulling out and then turning the single knob.

Another feature of the counter is the ease with which the count is cleared by turning the knob and dial back to zero. A spring detent is provided so that the pointer comes to rest squarely on a number and not between the numbers.

The counter may be provided with a switching circuit which reverses the input circuits to the count coils when a preset count is reached so that the device operates as a repeating counter for batches each comprising a preset number. When the predetermined count is reached a contact closes energizing the switching circuit and reversing the input circuits to the count coils. The counter operates in reverse until zero count is reached when the input circuits are again reversed. Thus, repetitive counts can be made continuously.

The invention will be described more fully with reference to the following drawings in which.

Figure 1:
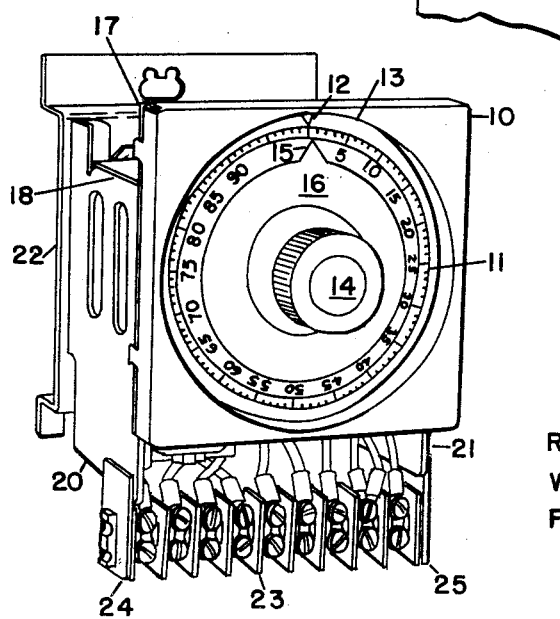
FIGURE 1 is a perspective view of the exterior of the add and subtract counting device.

Referring now to FIGURE 1, the numeral 10 indicates a bezel or cover having a rectangular outline and a circular opening. Inside the circular opening is a dial 11 adapted to be rotated counter clockwise as the add circuit is deenergized and clockwise as the subtract circuit is deenergized. The net count is read on the dial opposite the pointer 12 on pointer plate 13. Manual rotation of knob 14 moves the dial 11 in a manner to be described independently of the internal mechanism and count circuits and serves to manually reset dial 11 back to zero. The dial 11 shown is graduated in units with each fifth unit designated by numerals 5 through 95.

A second pointer 15 on indicator 16 rotates with the dial 11 when the dial 11 is rotated manually or by the counting circuits. Indicator 16 may be manually rotated with respect to dial 11 by pulling knob 14 outward and then turning it. Pulling knob 14 outwardly disconnects indicator 16 from dial 11. The pointer 15 is normally set to a predetermined count at which count an electric circuit is closed to produce an external effect.

The bezel 10 is affixed to a front plate 17 which, in conjunction with top plate 18 and side plates 20, 21 and back plate 22, form an enclosure for the counting mechanism. A terminal strip 23 is affixed to the side plates 20, 21 having terminal brackets 24, 25 and provides for electrical connection.

Figure 2:
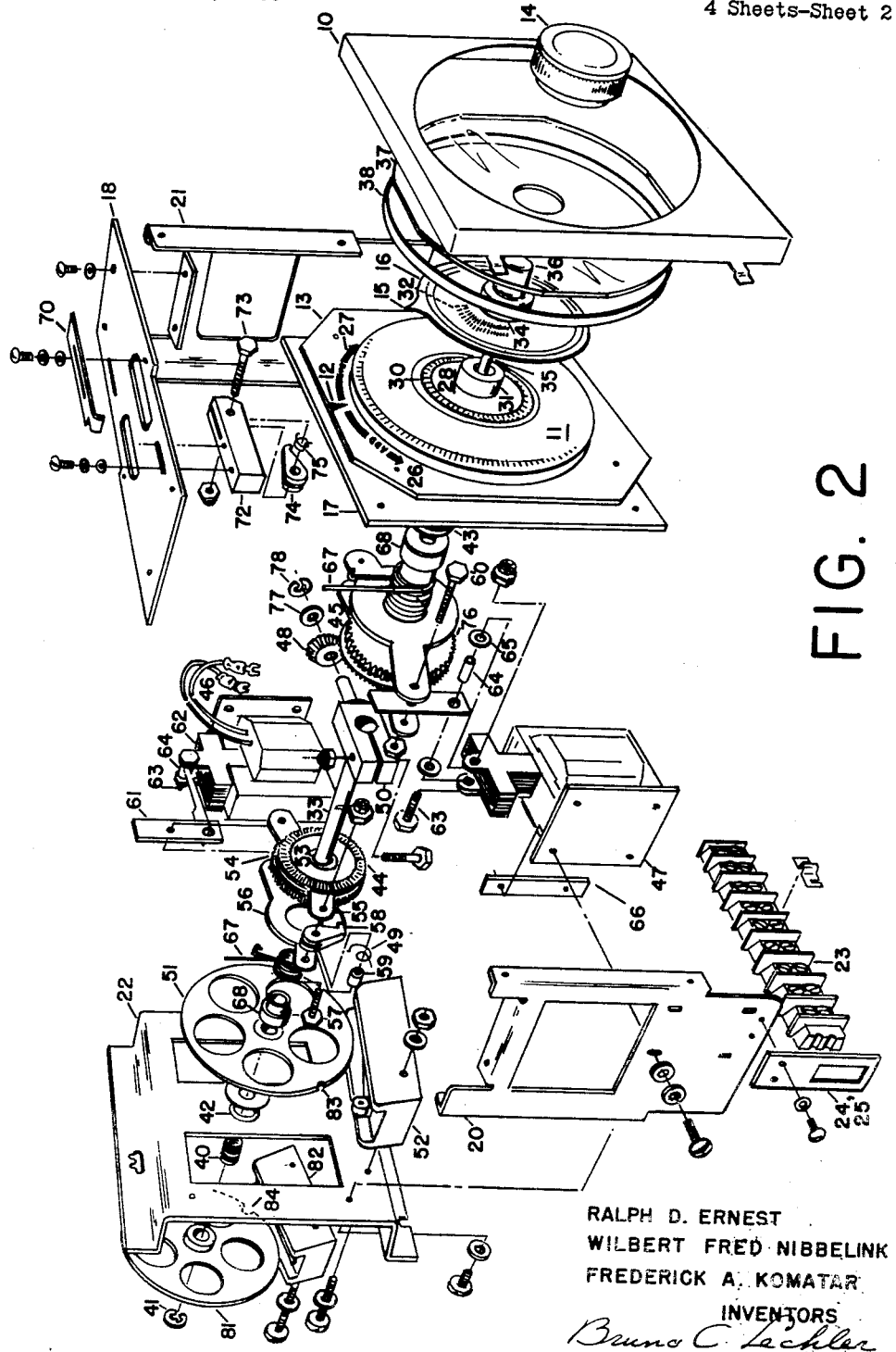
FIGURE 2 is an exploded view of the device.

The internal mechanism of the timer is shown in exploded view in FIGURE 2. The front plate 17 supports a coaxial dial and indicator assembly consisting of a pointer plate 13 on which a pointer 12 is stenciled. A counter clockwise arrow 26 with the word "Add" and clockwise arrow 27 with abbreviation "Sub" respectively indicate the direction of rotation of dial 11 when add and subtract counts are entered. Circular dial 11 is substantially coplanar with pointer plate 13.

Affixed to dial 11 is a driven clutch member 28 comprised of a driven clutch face 30, and a hub 31. The clutch face 30 in the preferred embodiment has 100 teeth which mesh with a similar driving clutch face 32 on the rearward surface of indicator 16. The hub 31 to which the clutch face 30 and the dial 11 are staked is adapted to be fixed to the front end of the hollow indicator shaft 33. Similarly, the hub 34 to which the front driving clutch 32 and indicator 16 are staked is adapted to be fixed to the front end of the count setting shaft 35. So that the clutch faces will be able to mesh, the hub 34 has one portion with a larger internal diameter than the external diameter of hub 31. Hub 34 has an extension 36 of sufficient length and diameter to accommodate knob 14 affixed thereon by set screws or other friction device, so that indicator 16 always moves with knob 14. A transparent dial cover 37 fits inside bezel 10 and is spaced from counter plate 13 by the retainer ring 38.

Manual adjustment of indicator 16 relative to dial 11 which normally moves with indicator 16 is made by pulling out and rotating knob 14. The latch pawls of the internal counter drive mechanism hereinafter described provide a detent action for dial 11 so that the dial 11 always resides at a digit and not between digits. Setting of the predetermined count is thus accomplished by pulling out and rotating knob 14. Pulling out knob 14 pulls indicator 16 away from dial 11 disengaging front clutch face 32 from clutch face 30. Pointer 15 may be rotated freely to any digit on dial 11. Release of knob 14 reengages the clutch face and locks the preset count into the counter. The clutch faces are drawn together by the main shaft spring 40 on the rearward end of the count setting shaft 35. Spring 40 is retained on shaft 35 by preset cam 81 and by truarc 41.

The count mechanism is built around the indicator shaft 33 which is rotationally supported in oilite bushings 42, 43 in back plate 22 and front plate 17, respectively. The count mechanism consists essentially of a bevel gear differential having two bevel gears 44, 45 free to rotate on shaft 33 when ratcheted by add solenoid 46 or subtract solenoid 47, respectively, and a bevel pinion 48 journaled on the pinion arm 50 which is rigidly attached to the indicator shaft 33. Each deenergization of the add solenoid 46 serves to move bevel gear 44 one increment counterclockwise; each deenergization of the subtract solenoid 47 serves to move bevel gear 45 one increment clockwise. This motion is transmitted through bevel pinion 48 to rotate pinion arm 50, indicator shaft 33 and dial 11. The rotation is also transmitted to zero cam 51 which actuates the microswitch 52 when the zero point is indicated on dial 11.

Figure 3:
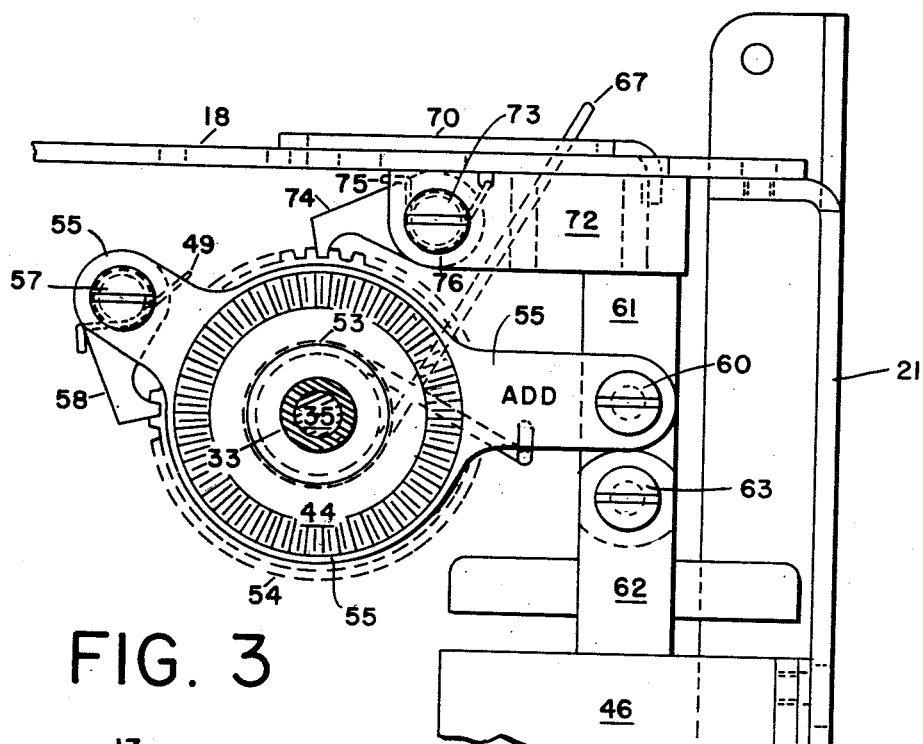
FIGURE 3 is a front view of one of the ratchet gear and pawl assemblies.

Bevel gear 44 is a part of an assembly made up of a hub 53, a ratchet gear 54 and a ratchet arm 55. The assembly is shown in FIGURE 3 which supplements the exploded view shown in FIGURE 2. The bevel gear 44 and the ratchet gear 54 are staked to hub 53 in spaced apart relationship. Between the two is a space for the ratchet arm 55 to rotate freely on hub 53. A second ratchet arm 56 is also free to rotate on an extension of hub 53. Ratchet arms 55, 56 are joined together with ratchet arm screw 57 and together support the feed pawl 58. A ratchet arm spacer 59 forms a bearing surface over screw 57 for pawl 58. A feed pawl spring 49 maintains the pawl in mesh with ratchet gear 54. The other ends of ratchet arms 55, 56 are also joined together with a screw 60 which forms a bearing for solenoid link 61 which fits between the ends of arms 55, 56. The other end of solenoid link 61 is rotationally attached to the top of the movable element 62 of add solenoid 46 with solenoid link pin 63, solenoid link bushing 64, and two solenoid link spacers 65.

Add solenoid 46 is attached to the right side plate 21 with four screws and two solenoid holding bars 66. The two solenoid leads are connected to the add terminal and the ground terminal on terminal strip 23. A reset spring 67 is coiled about the spring hub spacer 68 which is free to rotate on shaft 33. One end of reset spring 67 bears against the bottom of ratchet arms 55, 56 urging the arms and movable solenoid element 62 upward. The other end of reset spring 67 is retained by the spring adjusting bracket 70 which is attached to top plate 18. Bracket 70 is slidable to permit adjustment of reset spring torque.

A latch pawl bracket 72 is also attached to top plate 18 and carries a latch pawl shaft 73, a latch pawl 74, and a latch pawl spring 75. The latch pawl 74 prevents rotation of the ratchet gear 54 when solenoid 46 is energized to rotate ratchet arms 55, 56. The top of solenoid link 61 rests against the bottom of the latch pawl bracket 72 when the solenoid 46 is deenergized. This serves to maintain the proper air gap spacing of the movable element 62 in solenoid 46. Some duplicate parts are omitted from FIGURE 2 to maintain the clarity of the drawing, but an identical arrangement of apparatus is used in conjunction with the subtract solenoid 47 for transmitting increments of clockwise rotation to ratchet gear 76 and bevel gear 45.

Clockwise rotation of bevel gear 45 urges bevel pinion 48 to rotate on its shaft on pinion arm 50 and to rotate pinion arm 50 in a clockwise direction. A gear reduction of 2:1 is inherent in the differential; for each of ratchet gears 54 and 76 has 50 teeth plus requiring 100 add or 100 subtract counts to rotate pinion arm 50 and thereby dial 11 one revolution in a counterclockwise direction respectively.

Figure 4:
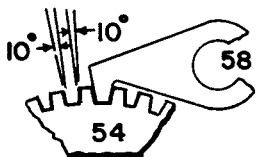
FIGURE 4 is an enlarged view of ratchet gear and pawl design.

The design of the teeth on ratchet gears 54, 76 and the teeth on the identical feed and latch pawls 58, 74 is important to the success of the counter and is shown in greater detail in FIGURE 4, with each tooth face forming an angle of 10 degrees with a perpendicular to a plane passed parallel to the axis and through corresponding lines of the opposed faces. The feed pawls 58 must urge the ratchet gears 54, 76 one tooth forward for each count and the latch pawls 74 must latch before and after each count. In addition, the pawls must be shaped to permit manual override as knob 14 is rotated. When knob 14 is rotated, the pinion arm 50 and bevel pinion 48 rotates both bevel gear assemblies simultaneously and this forces all four pawls out of the way of ratchet gears 54, 76 to permit such rotation.

Also, the relationship between bevel pinion 48 and pinion gears 44, 45 is important. Backlash must be correct so that the proper amount of rotation is transmitted to bevel gears 44, 45 so that the pawls latch properly. Bevel pinion 48 is retained on the shaft portion of pinion arm 50 by a spacer 77 and a truarc 78.

The electric output portion of the counter will now be described. Two snap acting switches 52, 82 are rigidly attached near the bottom of backplate 22 with the switch actuators facing upward. The switch actuators carry small rollers which roll on the periphery of zero cam 51 and preset cam 81 as the cams rotate. As described above, zero cam 51 is fixed to the rearward end of indicator shaft 33. Preset cam 81 is fixed to the rearward end of count setting shaft 35. Mainshaft spring 40 is compressed between back plate 22 and the hub of preset cam 81, thus maintaining the clutch faces 30, 32 in engagement.

A small segment 83 is removed from the periphery of zero cam 51 and permits actuation of switch 52 when dial 11 is at zero. A similar segment 84 is removed from the periphery of preset cam 81 and permits actuation of switch 82 when the pointer 15 of indicator 16 coincides with the pointer 12. Thus, with the dial set at zero and indicator 16 also set at zero, both switches 52, 82 are actuated. If the knob 14 is pulled out and pointer 15 turned to a predetermined digit, the preset cam 81 will be rotated a like amount. Subsequent counting by the solenoids rotates cam 81 until notch 84 permits actuation of switch 82.

Switches 52, 82 are in this embodiment each single pole, double throw. Each switch 52, 82 has three individual terminal screws which are connected to individual screw terminals on the terminal strip 23. Thus, one circuit through each switch can be connected to be open when the actuator is permitted to lift into notch 83, 84 and be closed at all other counts. Another circuit through each switch can be connected to be closed when the actuator lifts into notch 83, 84, and be open at all other counts.

The design of the counter mechanism by including a differential makes it possible to add and subtract pulses which occur in any order. The pulses may be simultaneous, may overlap, or one pulse may continue for an extended time without miscounting. The count in each instance is accumulated on the termination of the pulse, which deenergizes the count coil.

The counter will count continuously as long as pulses are applied to the solenoids. Continuous counting turns the dial around and around. A signal may be secured every 50 counts if the preset cam 81 is set at 50 and the zero cam 51 is set at zero. One signal will originate from switch 82 when actuated at 50 by the preset cam 51 and one signal will originate from switch 52 when actuated at zero by the zero cam 51. Special cams can be provided with a plurality of segments removed at increments spaced around the periphery of the cam. Then an output signal will occur every 5, 10, 20 or 25 counts, depending on the cam contour. By using a cam cut every five counts for example, and by initially setting the pointer 15 away from zero by a preselected figure, say 3, an output signal may be obtained at the count of 3, 8, 13, 18 and so on. The flexibility of the counter is almost unlimited.

The form of the invention described herein, by way of illustration, is designed to count up to one hundred. That is, each revolution of dial 11 results from a net count of one hundred. The number of teeth on ratchet gears 54 and 76 may be increased to 100 to make the counter applicable to totals up to 200.

Figure 5:
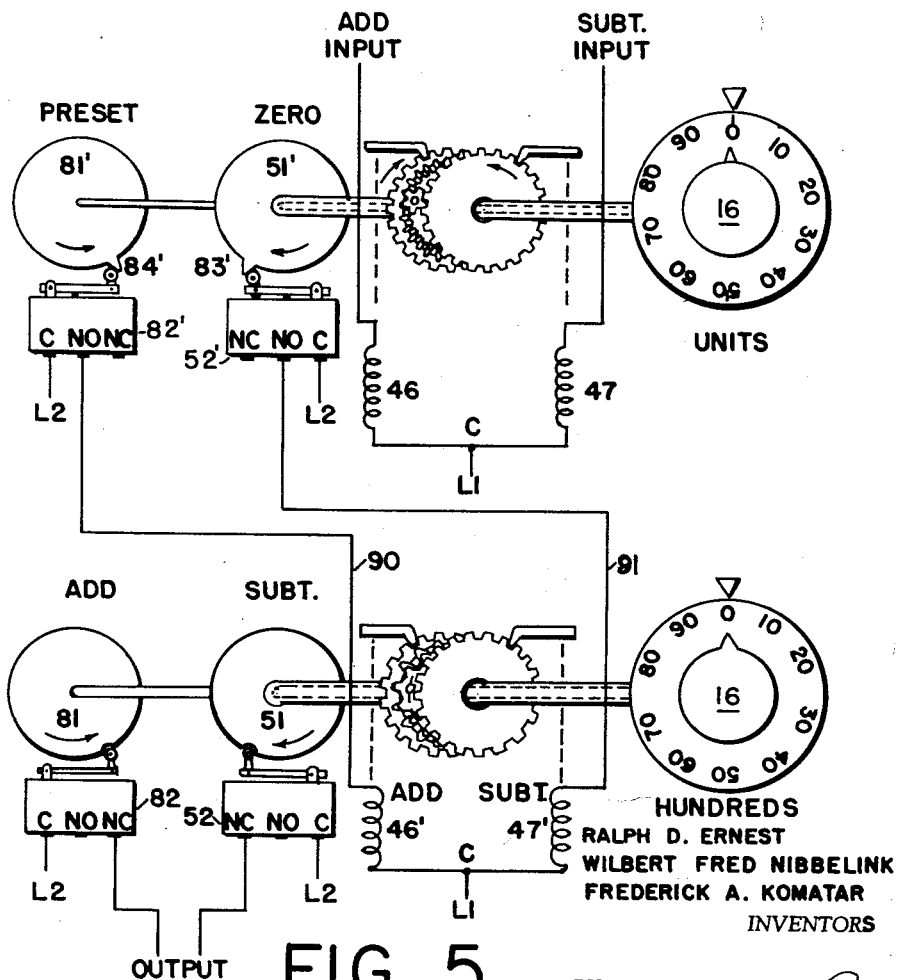
FIGURE 5 shows diagramatically a modified form of the invention having two cascading counters in series to count to a much higher net count.

When it is desired to add and subtract to a much higher net count it is possible to cascade two of the subject counters in series electrically as shown in FIGURE 5. The add and subtract count impulses are applied to the add and subtract solenoid coils 46, 47 of the first counter. The indicator 16 is set at zero and the output pulses from the two switches 52′, 82′ are applied to the add and subtract solenoid coils 46′, 47′ of the second counter. Special one way snap acting switches 52′, 82′ are used on the first counter so that passage of cam rises 83′, 84′ are registered only in one direction. As the rise 84′ on preset cam 81′ passes in a counter clockwise direction it actuates one way switch 82′; as it passes in a clockwise direction switch 82′ is inoperative; as the rise 83′ on zero cam 51′ passes in the clockwise direction it actuates one way switch 52′; as it passes in the counter clockwise direction switch 52′ is inoperative.

The counts of one hundred are accumulated on the second counter. When switch 82′ is actuated by rise 84′ with the one hundredth count net, current is sent over line 90 to add solenoid coil 46′ of the second counter. At the completion of the hundredth count switch 82′ deenergizes line 90 and the digit 1 is registered on the "hundreds" counter. Should a number of subtract counts be registered on the units counter and the rise 83′ on the zero cam 51 actuate switch 52′, current is sent over line 91 to the hundreds subtract solenoid 47′.

Power for operating the second counter is provided from line L2 which is connected to a local source of power. Line L1 is the return.

Switches 82 and 52 on the hundreds counter are standard. Switches 82′ and 52′ on the units counter may be of the type manufactured by the Microswitch Company, catalog number BZ-2RW825, and are termed one-way actuator switches.

In another form of the invention the counter may be used to determine whether a series of timed events are occurring at the desired rate, or whether they are occurring ahead of or behind schedule. For example, it may be desired to know whether a machine or a skilled workman is producing at the rate prescribed. A timer is first set to close and open a circuit to energize and deenergize the subtract solenoid 47 at the prescribed rate. A second circuit is established and broken to energize and deenergize the add solenoid 46 each time a piece moves from the machine or is completed by the workman. The net count shown on dial 11 is the number of pieces the machine or workman is ahead of or behind schedule. It is understood that subtract pulses will be supplied to the counter only during production hours and that the pulses will be interrupted during the noon hour and during rest periods. If desired, incentive pay may be computed by adding the extra units shown on the counter to the number of units prescribed for the period.

*Repeat Counter*

Figure 6:
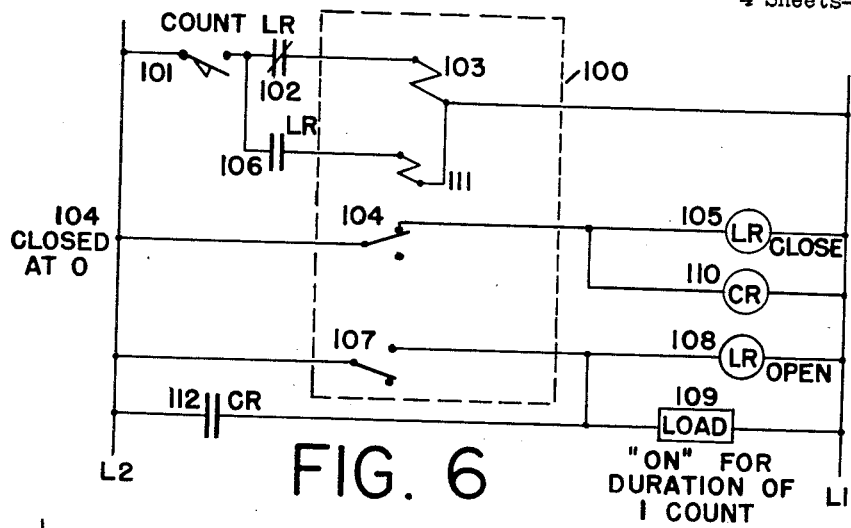
FIGURE 6 is a wiring diagram of one method of switching the count coils to make the counter count repetitively and double the range of the counter.

In another form of the invention the counter may be used with a single pole double throw latch relay which is energized into one position at a preset count and into another position at zero count. The circuit is shown in FIGURE 6 in the form of a line to line wiring diagram.

A source of potential is applied to lines L1, L2. The add subtract counter is outlined at 100. A switch 101 is closed each time a passing object actuates it. In the condition illustrated, current flows from line L2, through the momentarily closed count switch 101, through the normally closed latch relay contacts 102, to the add coil 103, and to line L1.

Assuming the counter was at zero before the first count was registered, the first count will open zero switch 104 deenergizing the closing coil 105 of the latch relay. This has no effect on the latch relay because it maintains its contacts 102, 106 in the position shown. Continued count impulses rotate the dial and cams until the preset digit is reached. Then contacts 107 close and energize the opening coil 108 of the latch relay. Contacts 102, 106 reverse positions, contacts 102 opening and contacts 106 closing. Additional count impulses energize the subtract coil 111 and gradually move the dials and cams back to zero. At the zero count, contacts 104 close and energize the latch relay closing coil 105 which again reverses contacts 102, 106. This process continues as long as count impulses are received.

The load 109 is energized at the preset count and at zero. At the preset count, current flows from line L2, through contacts 107, load 109, to line L1. At the zero count, relay coil 110 is energized through contacts 104. Relay contacts 112 close and energize the load 109. Thus, the load is pulsed each time the preset count is reached.

The range of the counter may be doubled by eliminating relay coil 110 and contacts 112. The load would be pulsed each time twice the preset number of counts is received. For example, if the dial of the 100 count counter is set for 95, the counter would count to 95, reverse itself and count another 95, and pulse the load on the 190th count. The range of the counter is doubled by this circuit.

*Repeat Add Subtract Counter*

Figure 7:
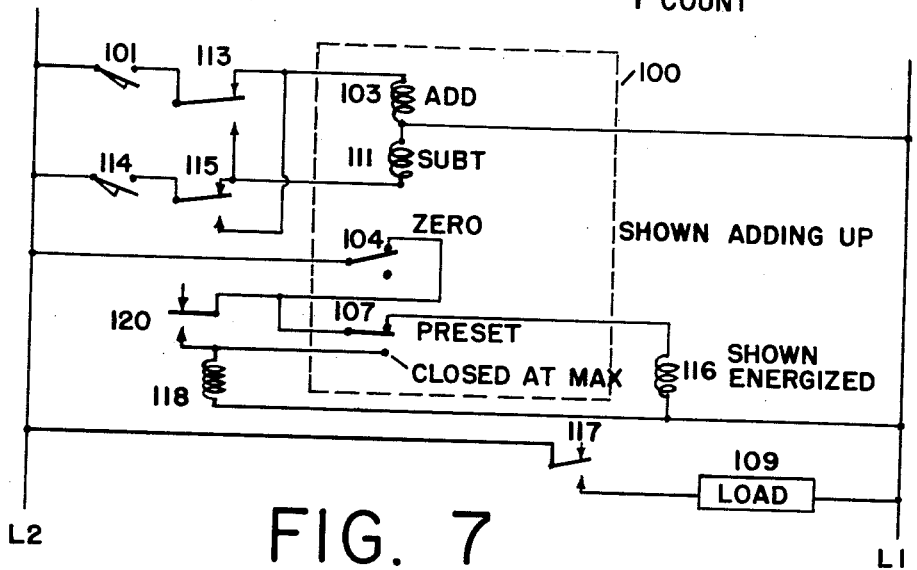
FIGURE 7 is a wiring diagram of a second method of switching count coils to make the counter add and/or subtract repetitively.

The circuit shown in FIGURE 6 may be changed to include double pole double throw relay contacts as shown in FIGURE 7 to permit the counter to add or subtract repetitively. The device is shown in the adding condition in FIGURE 7.

As the add count switch 101 is closed by the passing of an article, add coil 103 is energized from line L2 through the transfer relay contacts 113. Subtract impulses are supplied when subtract count switch 114 is closed. Current flows from line L2, through count switch 114, through transfer contacts 115 to subtract coil 111 and thence to line L1.

Zero switch 104 is in the position shown and supplies power to relay coil 116 through preset switch 107. Manually closed contacts 117 are controlled by relay coil 116 and are usually open because coil 116 is usually energized. Load 109 is thus usually deenergized.

When the preset net number of impulses is counted, preset contacts 107 transfer and supply power to transfer relay coil 118. Relay coil 116 is deenergized and contacts 117 are closed and energize the load 109 until the next count pulse is received.

Transfer relay coil 118 seals itself in through holding contacts 120 and zero switch 104. When transfer contacts 113, 115 change position they cause add impulses to energize the subtract coil 111, and subtract impulses to energize the add coil 103. Preset contacts 107 close with the first "subtract" impulses and reenergize relay coil 116. Contacts 117 open and deenergize load 109.

The counter continues to register the net count until it reaches zero. At zero, zero switch 104 opens and breaks the holding circuit to relay coil 118. When coil 118 is deenergized it retransfers contacts 113, 115 to the position shown in FIGURE 7. Zero switch 104 interrupts power to relay coil 116 and contacts 117 close to energize load 109. The next net add impulse starts the cycle again.

Thus, the load 109 is pulsed at each net preset count and at zero. To the load, the device appears as a repeat counter.

It is understood that many modifications could be made without departing from the spirit of the invention. What we desire to protect by Letters Patent is set forth in the appended claims.

We claim:

1. In a differential counter, first count means responsive to impulses from an add count switch, second count means responsive to impulses from a subtract count switch, indicating means differentially connected between said first and second count means adapted to register and display the difference in responses therebetween, a first electric switch actuated when said indicating means is at zero, a second electric switch actuated when said indicating means registers a preset difference, and an element movable with said indicating means for actuating said second switch and adjustable relative to said indicating means to preset said element for actuation of the second switch at a registered preset difference.

2. An add subtract device, having in combination, a hollow shaft, a bevel gear freely rotatable stepwise on said shaft, add stepping means adapted to rotate said bevel gear one step at a time, a second bevel gear freely rotatable stepwise on said shaft, subtract stepping means adapted to rotate said second bevel gear one step at a time in the opposite direction, pinion arm means mounted on said hollow shaft for rotating said shaft, bevel pinion means engaging both of said bevel gears and supported by said pinion arm means whereby rotational movement of said bevel pinion means by said bevel gears will be transmitted to said hollow shaft by said pinion arm means, a cam carried by said hollow shaft, an electric switch actuated by said cam, a second shaft extending through said hollow shaft, a cam carried by said second shaft, an electric switch actuated by said second cam, clutch means engageable to releasably secure said two shafts together for preventing relative rotation of one said shaft with respect to the other, and means secured to said second shaft for disengaging said clutch means whereby the angular relation of said shafts and their attached cams may be changed.

3. A system for registering on two substantially identical counters a total greater than is registerable on either one counter individually, comprising a first add-subtract counter having add means actuated by each add impulse and subtract means actuated by each subtract impulse and totalizing means registering the excess of add actuations over subtract actuations, a first circuit closed each time the totalizing means registers a preset value or a multiple thereof and a second circuit closed each time the totalizing means registers zero, a second add-subtract counter having add means actuated through said first circuit each time the totalizing means registers the preset value or a multiple thereof and subtract means actuated through said second circuit each time the totalizing means registers zero, and second totalizing means registering the excess of the second said add actuations over the second said subtract actuations, and means for actuating a switch when the last-mentioned totalizing means reaches a preset value.

4. An external circuit for adapting to use as a repeat counter an add-subtract differential counter having an add solenoid and a subtract solenoid and differential means for registering the net difference between add solenoid actuations and subtract solenoid actuations and a zero switch closed only when said counter registers zero count and a second switch closed when a preset count is registered, said external circuit comprising: a control relay having a coil and a pair of normally open contacts, said coil connected through said zero switch and energized only at zero count and when energized closing its contacts to energize a load circuit, and a latching relay having a latch coil and an unlatch coil and a set of transfer contacts controlled thereby, said latch coil connected through said zero switch and energized at zero count, said unlatch coil connected through said second switch and energized at the preset count, a count switch closed during each count and connected through said transfer contacts to energize said add solenoid for counts up to the preset number and through said transfer contacts transferred to energize said subtract solenoid for counts past said preset number back to zero.

5. A device as in claim 4, including a load circuit connected through said pair of relay contacts to be energized at zero count and connected through said second switch to be energized at the preset count.

6. An external circuit for adapting to use as a repeat add-subtract counter an add-subtract differential counter having an add solenoid and a subtract solenoid and differential means for registering the net difference between add solenoid actuations and subtract solenoid actuations and having a zero switch closed when said counter registers any count other than zero and having a second switch with first contacts closed at all counts other than a preset count and other contacts closed only at a preset count, said external circuit comprising a transfer relay having a coil connected to be energized through said zero switch and said second switch in series at the preset count and having a pair of normally open holding contacts in parallel with said other contacts of the second switch adapted to hold said transfer relay energized until said zero switch opens at zero count, said transfer relay having two sets of transfer contacts adapted in the deenergized condition to connect said add solenoid to an add impulse source and to connect said subtract solenoid to a subtract impulse source and in the energized condition to connect said add solenoid to the subtract impulse source and to connect said subtract solenoid to the add impulse source, and a load relay connected through said zero switch and said first contacts of the second switch to be energized at all counts except the zero count and the preset count, and a pair of normally closed contacts controlled by said load relay closed at said zero count and at said preset count.

7. A calculating device adapted for use in counting out from units submitted thereto equal lots of acceptable units excluding rejects, comprising electrical add means actuated by each submitted unit, and electrical subtract means actuated by each rejected unit, differential means operated by said add means and said subtract means to derive a net total, means to preset a given total, a switch closed when the net total reaches said given total, a circuit actuated thereby to produce a signal and to reverse the electrical connections to said add and subtract impulse actuated devices.

8. A differential counter-recorder comprising, a first rotary count indicator, first counting means for counting elements at a first location, first transmission means operatively connecting said first counting means to move said count indicator in a positive direction, second counting means for counting elements at a second location, and second transmission means operatively connecting said second counting means to move said count indicator in a negative direction so that the instant position of said indicator at all times represents the net difference of said counts, and a presettable pointer on a second rotary count indicator rotatively adjustable relative to said first count indicator for movement therewith to position a switch actuating member so that a predetermined count may be selected as desired at which said switch is to be actuated.

9. A differential counter-recorder in accordance with claim 8, characterized by having zero switch operating means connected to said first rotary count indicator, and zero switch means operated by said operating means when the number of negative counts is equal to the number of positive counts.

10. A counter-recorder and controller comprising, a hollow shaft, means rotatively supporting said hollow shaft, an indicator disc rotatively supported on one end of said hollow shaft for rotation therewith, a rotatable center shaft extending slidably through said hollow shaft, counting means for driving said hollow shaft in accordance with a count to be made, means releasably interconnecting said center shaft to said disc and hollow shaft whereby said center shaft may be rotated relative to said disc as desired, and control means actuated from said center shaft when it has been rotated with said hollow shaft to a predetermined angular position.

11. A counter-recorder of the character described in claim 10, wherein said means releasably interconnecting said center shaft to said disc and hollow shaft comprises, a knob on the outer end of said center shaft in opposed relation to said disc, a clutch face projecting forwardly of said disc, an indicator fixed on said center shaft adjacent said disc, a second clutch face projecting rearwardly from said indicator, a plurality of teeth spaced about a circular path on each of said clutch faces adapted to mesh with each other, and resilient means urging said center shaft to slide axially in said hollow shaft in a direction to seat said clutch faces in an engaged relation in any selected one of a plurality of positions.

12. A differential counter-exhibitor permitting manual reset of the count indicator at any time before, during, or after a preset count is reached, including, a rotary count indicator, first counting means first transmission means operatively connecting said first counting means to move said count indicator in a positive direction, second counting means and second transmission means operatively connecting said second counting means to move said count indicator in a negative direction so that the instant position of said indicator at all times shows the difference of counts made by the said counting means, knob means rotatably adjustable relative to said indicator for adjustably presetting a predetermined count difference, preset switch means and presettable switch operating means connected to said knob means, said preset switch means operated by said operating means at said predetermined count, detent means on each said transmission means enabling said count indicator to be rotated manually by manual rotation of said knob against the restraining torque supplied by said detent means, and indexing means between said count indicator and said knob means enabling said knob means to be rotated manually by manual rotation of said knob after said indexing means is disengaged by manual partial withdrawal of said knob with respect to said count indicator.

References Cited in the file of this patent
UNITED STATES PATENTS

| | | |
|---|---|---|
| 2,030,624 | Ek et al. | Feb. 11, 1936 |
| 2,122,710 | Bidwell et al. | July 5, 1938 |
| 2,213,346 | Mumma | Sept. 3, 1940 |
| 2,441,767 | Johansson | May 18, 1948 |
| 2,556,374 | Koechel | June 12, 1951 |
| 2,588,107 | Grabau | Mar. 4, 1952 |
| 2,617,558 | Ross | Nov. 11, 1952 |
| 2,656,106 | Stabler | Oct. 20, 1953 |
| 2,679,355 | Savino | May 25, 1954 |
| 2,721,701 | Hardesty et al. | Oct. 25, 1955 |
| 2,730,300 | Savino | Jan. 10, 1956 |

FOREIGN PATENTS

| | | |
|---|---|---|
| 785,885 | Great Britain | Nov. 6, 1957 |